United States Patent
Canedo

(10) Patent No.: US 9,804,581 B2
(45) Date of Patent: Oct. 31, 2017

(54) METHOD FOR SYNTHESIS OF MULTI-FIDELITY SIMULATION MODELS USING FUNCTIONAL OPERATORS

(71) Applicant: Siemens Product Lifecycle Management Software Inc., Plano, TX (US)

(72) Inventor: Arquimedes Martinez Canedo, Princeton, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 597 days.

(21) Appl. No.: 14/456,437

(22) Filed: Aug. 11, 2014

(65) Prior Publication Data

US 2015/0081254 A1    Mar. 19, 2015

Related U.S. Application Data

(60) Provisional application No. 61/865,218, filed on Aug. 13, 2013, provisional application No. 61/865,222, filed on Aug. 13, 2013.

(51) Int. Cl.
*G06F 17/50* (2006.01)
*G05B 17/02* (2006.01)
*G06F 9/455* (2006.01)

(52) U.S. Cl.
CPC .......... *G05B 17/02* (2013.01); *G06F 9/455* (2013.01); *G06F 17/50* (2013.01); *G06F 17/5009* (2013.01); *G06F 9/45504* (2013.01); *Y02T 10/82* (2013.01)

(58) Field of Classification Search
CPC ........................................... G06F 17/50
USPC ........................................... 703/1
See application file for complete search history.

(56) References Cited

U.S. PATENT DOCUMENTS

| 6,983,793 B2 | 1/2006 | Zheng et al. |
|---|---|---|
| 7,055,591 B2 | 6/2006 | Kang et al. |
| 2007/0151287 A1 | 7/2007 | Yahia et al. |
| 2013/0104589 A1 | 5/2013 | Lambert |
| 2014/0019104 A1 * | 1/2014 | Martinez Canedo ............... G06F 17/5009 703/6 |

FOREIGN PATENT DOCUMENTS

EP    2 615 547 A2    7/2013

OTHER PUBLICATIONS

Philippe Renard, Conditioning Facies Simulations with Connectivity Data, Dec. 2010.*

(Continued)

*Primary Examiner* — Lechi Truong

(57) ABSTRACT

Methods for synthesis of simulation models using functional operators. A method includes parsing a functional model, receiving a functional operator for a function within a simulation component of the functional model, receiving a structural template of the functional operator from a functional operator structural template library, mapping a plurality of functions according to the structural template of the functional operator to update the simulation component, and generating a simulation model with the updated simulation component.

17 Claims, 13 Drawing Sheets

(56) References Cited

OTHER PUBLICATIONS

Stefan Wolkl et al., "Model Libraries for Conceptual Design", Feb. 6, 2013, XP055160266, retrieved from the Internet: URL:http://mediatum.ub.tum.de/doc/1116655/1116655.pdf on Jan. 7, 2015, 137 pages.
European Search Report dated Mar. 11, 2015, for EP application No. 14180706.5-1954/2838043, 10 pages.
The Mathworks et al.:"Simulink, model-based and System-Based Design, Using Simulink Version 4"; Internet Citation; pp. 1-215; XP002500810; Retrieved from the Internet: URL: www.busim.ee.boun.edu.tr/-resources/slusing.pdf on Oct. 20, 2008, 215 pages.
Canedo, A., et al. "Context-sensitive Synthesis of Executable Functional Models of Cyber-Physical Systems." ICCPS'13, Apr. 8-11, 2013 Philadelphia, PA, pp. 99-108.
Abelein, U., et al. "Complexity, quality and robustness—the challenges of tomorrow's automotive electronics." Design, Automation Test in Europe Conference, Mar. 12-16, 2012. pp. 870-871.
Aberdeen Group. "System Design: New Product Development for Mechatronics." Jan. 2008. pp. 1-25.
Uckun, S. "Meta II: Formal Co-Verification of Correctness of Large-Scale Cyber-Physical Systems During Design." Palo Alto Research Center, Technical Report, Sep. 2011. pp. 1-43.
Broy, M., et al. "Engineering Automotive Software." Proceedings of the IEEE, vol. 95, No. 2, pp. 356-373, Feb. 2007.
Dumbacher, D.L. and Davis, S.R. "Building Operations Efficiencies into NASA's Ares I Crew Launch Vehicle Design." 54th JANNAF Propulsion Conf., May 2007, 25 pages.
Broy, M., et al. "Automotive Architecture Framework: Towards a Holistic and Standardised System Architecture Description." TUM Tech Report, Jul. 2009, 27 pages.
Bhave, A., et al. "View Consistency in Architectures for Cyber-Physical Systems." Cyber-Physical Systems (ICCPS). Apr. 2011, pp. 151-160.
Dahmus, J.B., et al. "Modular product architecture." Design Studies, vol. 22. No. 5, (2001), pp. 409-424.
Sangiovanni-Vincentelli, A. "Defining platform-based design." EEDesign of EETimes, Feb. 8, 2002, 6 pages.
Sangiovanni-Vincentelli, A., et al. "Taming Dr. Frankenstein: Contract-Based Design for Cyber-Physical Systems." European Journal of Control, vol. 18, No. 3, (2012), pp. 217-238.
McFarland, M.C., et al. "The High-Level Synthesis of Digital Systems." Proceedings of the IEEE, vol. 78, No. 2, Feb. 1990, pp. 301-318.
Harman, P. "The Role of Modelica in a Robust Engineering Process." Proceedings 7th Modelica Conference, Como, Italy, Sep. 20-22, 2009, pp. 637-640.
Hirtz, J., et al. "A Functional Basis for Engineering Design: Reconciling and Evolving Previous Efforts." NIST Technical Note 1447, Feb. 2002, 43 pages.
Erden, M.S. et al. "A review of function modeling: Approaches and applications." Artificial Intelligence for Engineering Design, Analysis and Manufacturing (2008), vol. 22, pp. 147-169.
Chakrabarti, A., et al. "Computer-Based Design Synthesis Research: An Overview." Journal of Computing and Information Science in Engineering, Jun. 2011, vol. 11, pp. 1-10.
Neema, S., et al. "Constraint-Based Design-Space Exploration and Model Synthesis." In Embedded Software, vol. 2855, (2003) pp. 290-305.
Smolek, P., et al. "Exploring the Possibilities of Co-Simulation with CATIA V6 Dynamic Behavior Modeling." In ERK' 2013, pp. 177-180.
FMI PLM Interface—Specifiation for Product Lifecycle Management (PLM) of modeling, simulation and validation information. V1.0. Technical Report, MODELISAR Consortium, Mar. 2011.
Helms, B. "Object-Oriented Graph Grammars for Computational Design Synthesis." PhD. thesis, Technische Universtiat, Munchen. Sep. 2012, 179 pages.
Willems, J.C. "The Behavioral Approach to Open and Interconnected Systems." Control Systems, IEEE, vol. 27, No. 6, Dec. 2007, pp. 46-99.
"Autosar Automotive Open System Architecture." Retrieved from www.autosar.org on Jul. 31, 2014, 2 pages.
LMS Imagine.Lab. Retrieved from www.plm.automation.siemens.com/en_us/products/lms/imagine-lab/index.shtml, Aug. 1, 2014, 3 pages.
"Modelica Association, Modelica." Retrieved from www.modelica.org on Jul. 31, 2014, 2 pages.
MathWorks, "Simscape." Retrieved from www.mathworks.com/simscape on Jul. 31, 2014, 2 pages.
"Modelon—Vehicle Dynamics Library." Retrieved from www.modelon.com/ on Jul. 31, 2014, 2 pages.
MathWorks, "Simulink." Retrieved from www.mathworks.com/simulink on Jul. 31, 2014, 3 pages.
Maplesoft, "MapleSim." Retrieved from www.maplesoft.com on Jul. 31, 2014, 1 page.
National Instruments, "LabVIEW System Design Software." Retrieved from www.ni.com/labview/ on Jul. 31, 2014, 2 pages.
Komoto, H. and Tomiyama, T. "A framework for computer-aided conceptual design and its application to system architecting of mechatronics products." Computer Aided Design, vol. 44, No. 10, pp. 931-946, Oct. 2012.
Charette, R.N., "This car runs on code." IEEE Spectrum, Feb. 2009. Retrieved from http://spectrum.ieee.org/transportation/systems/this-car-runs-on-code on Jul. 31, 2014, 7 pages.
Fantoni, G., et al. "Automatic extraction of function-behaviour-state information from patents." Advanced Engineering Informatics, 27(3), (2013), pp. 317-334.

* cited by examiner

300

FIG. 6
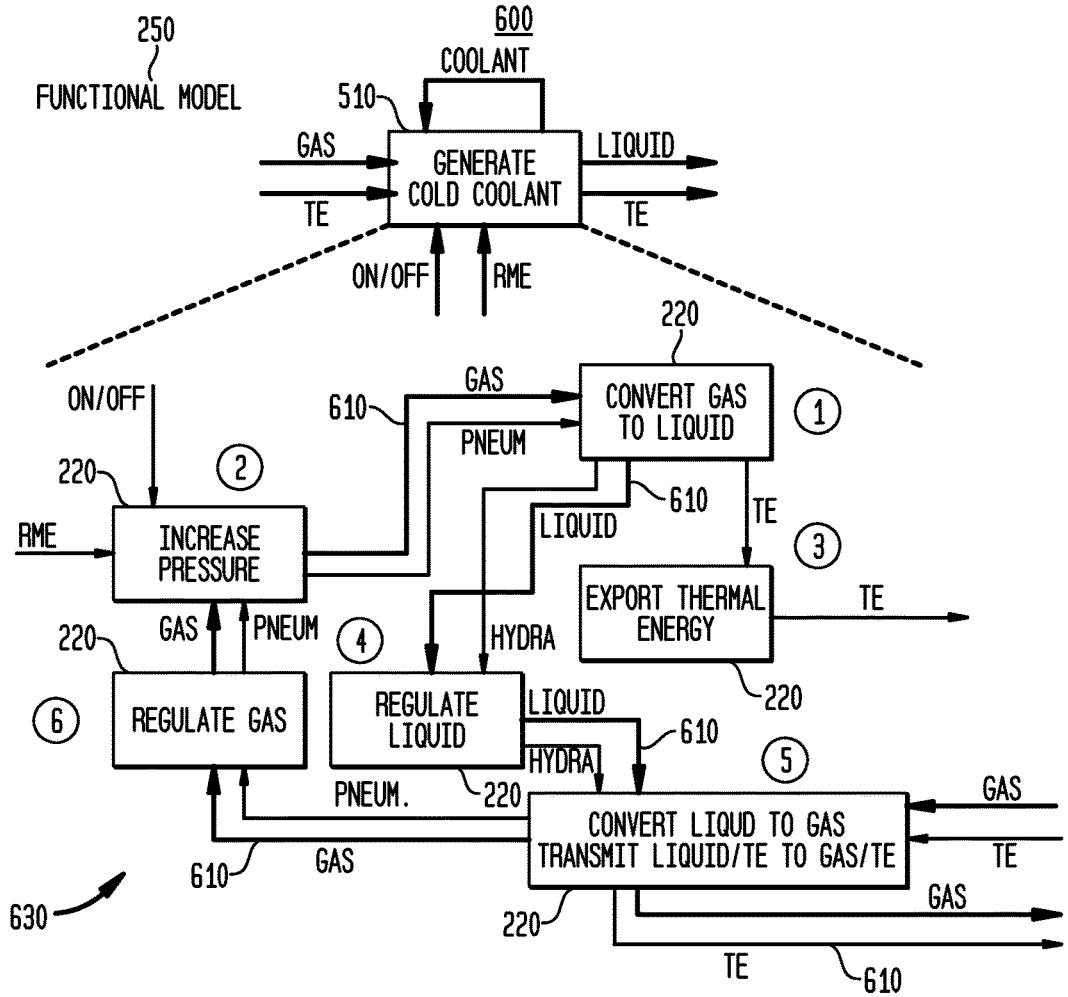
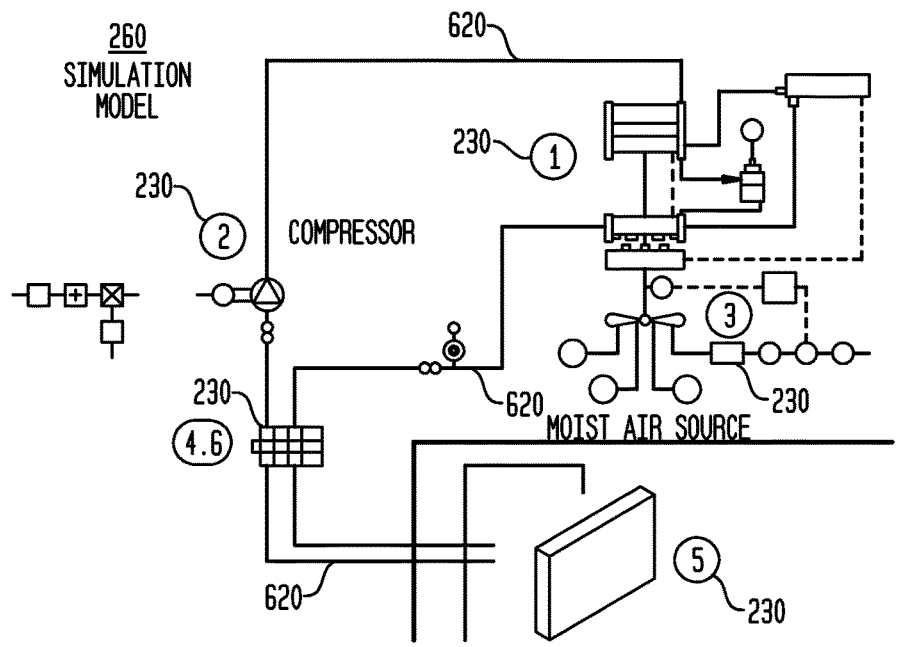

FIG. 8
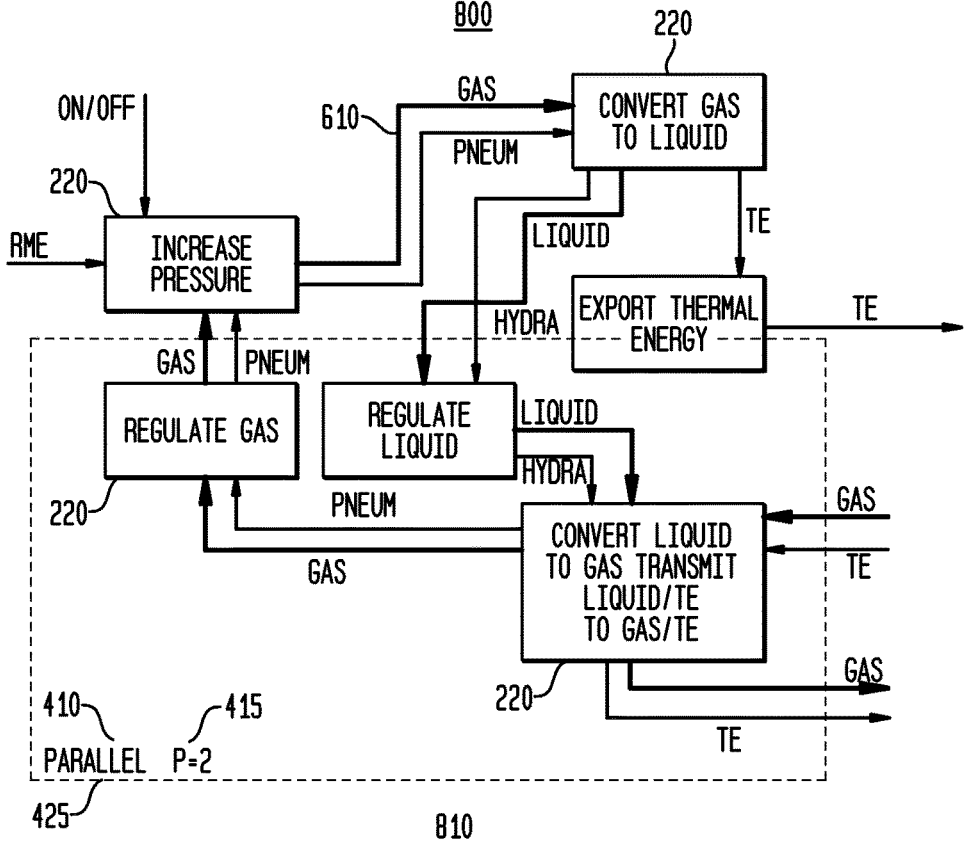
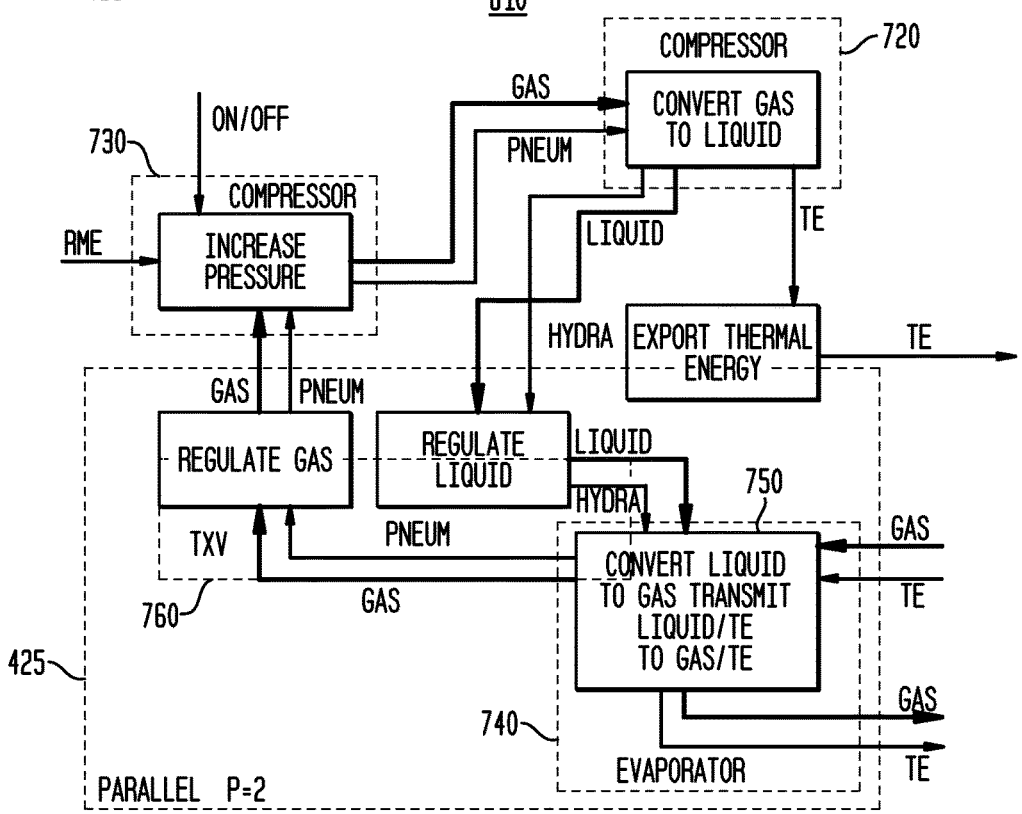

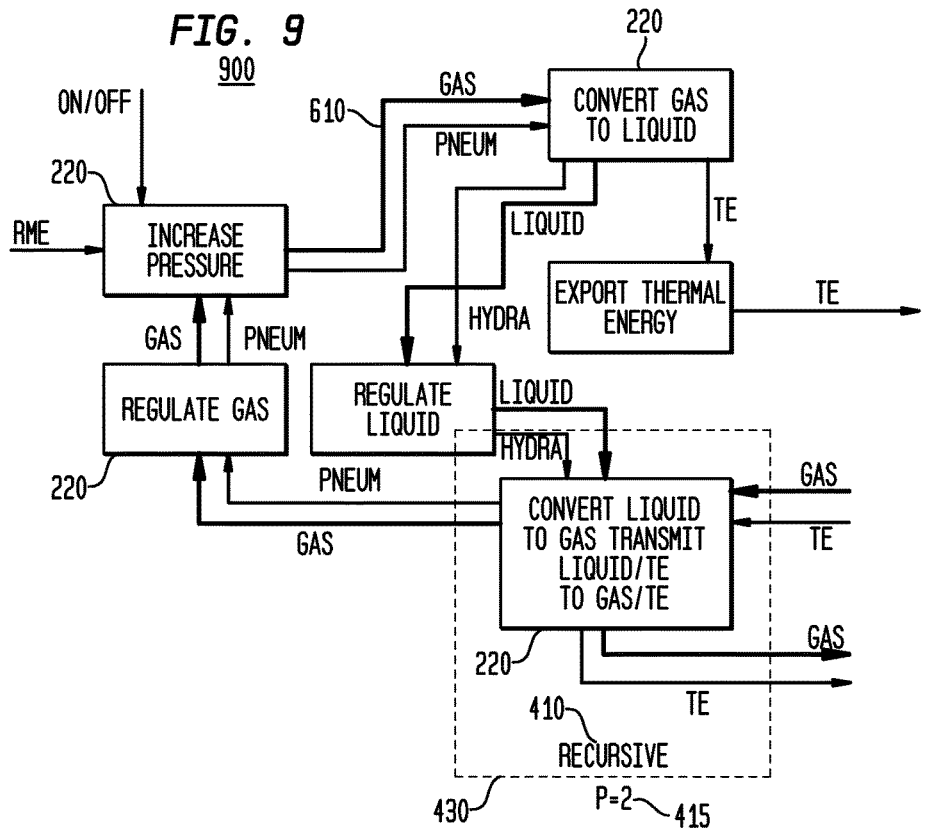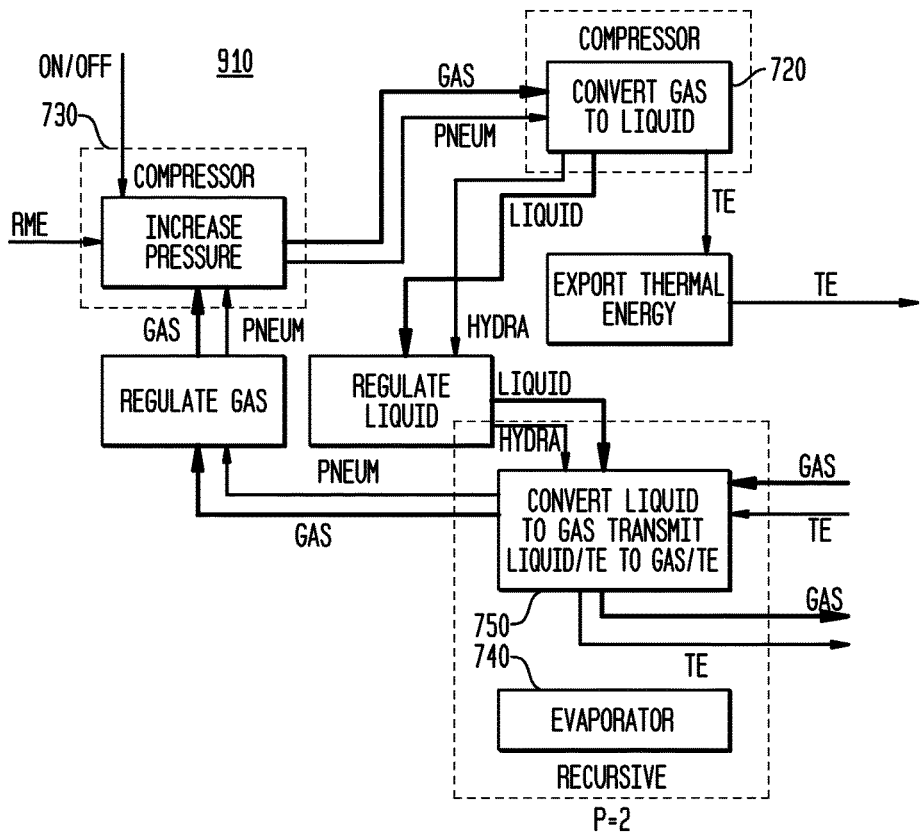

FUNCTIONAL MODEL 1000

1100

1300

METHOD FOR SYNTHESIS OF MULTI-FIDELITY SIMULATION MODELS USING FUNCTIONAL OPERATORS

CROSS-REFERENCE TO OTHER APPLICATION

This application claims the benefit of the filing date of U.S. Provisional Patent Application 61/865,218, filed Aug. 13, 2013, which is hereby incorporated by reference.

This application claims the benefit of the filing date of U.S. Provisional Patent Application 61/865,222, filed Aug. 13, 2013, which is hereby incorporated by reference.

This application shares some subject matter with commonly-assigned, concurrently filed U.S. patent application Ser. No. 14/456,392, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include a method for synthesis of simulation models using functional operators. The method includes parsing a functional model, receiving a functional operator for a function within a simulation component of the functional model, receiving a structural template of the functional operator from a functional operator structural template library, mapping a plurality of functions according to the structural template of the functional operator to update the simulation component, and generating a simulation model with the updated simulation component.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a functional decomposition and allocation to simulation components in accordance in accordance with disclosed embodiments;

FIG. 8 illustrates a parallel functional operator used to synthesize a dual thermal expansion valve (TXV)-evaporator implementation in accordance with disclosed embodiments;

FIG. 9 illustrates a recursive functional operator used to synthesize a dual-evaporator single-TXV implementation in accordance with disclosed embodiments;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments. Reference numbers are used consistently throughout the description to refer to similar elements in different figures.

Advanced cyber-physical systems (CPS) are some of the most technologically advanced and complex systems currently being produced. Modern cars are no longer mechanically-dominated systems; their physical behavior is greatly influenced by computers (electronic control units or ECUs) and network systems, cyber components. The remarkable advances in fuel economy, safety, performance, etc. have been possible due to the dense array of cooperating cyber components that interact with the physical processes in a car. Designing a modern car with hundreds of ECUs controlling dozens of complex physical processes is a daunting task that requires the collaboration of hundreds of domain experts from various organizations. Creating design automation tools that improve the automotive design process and allow companies to rapidly add new features, manage the heterogeneity of components, and maintaining the development time and cost targets is an equally challenging task.

Figure 1:
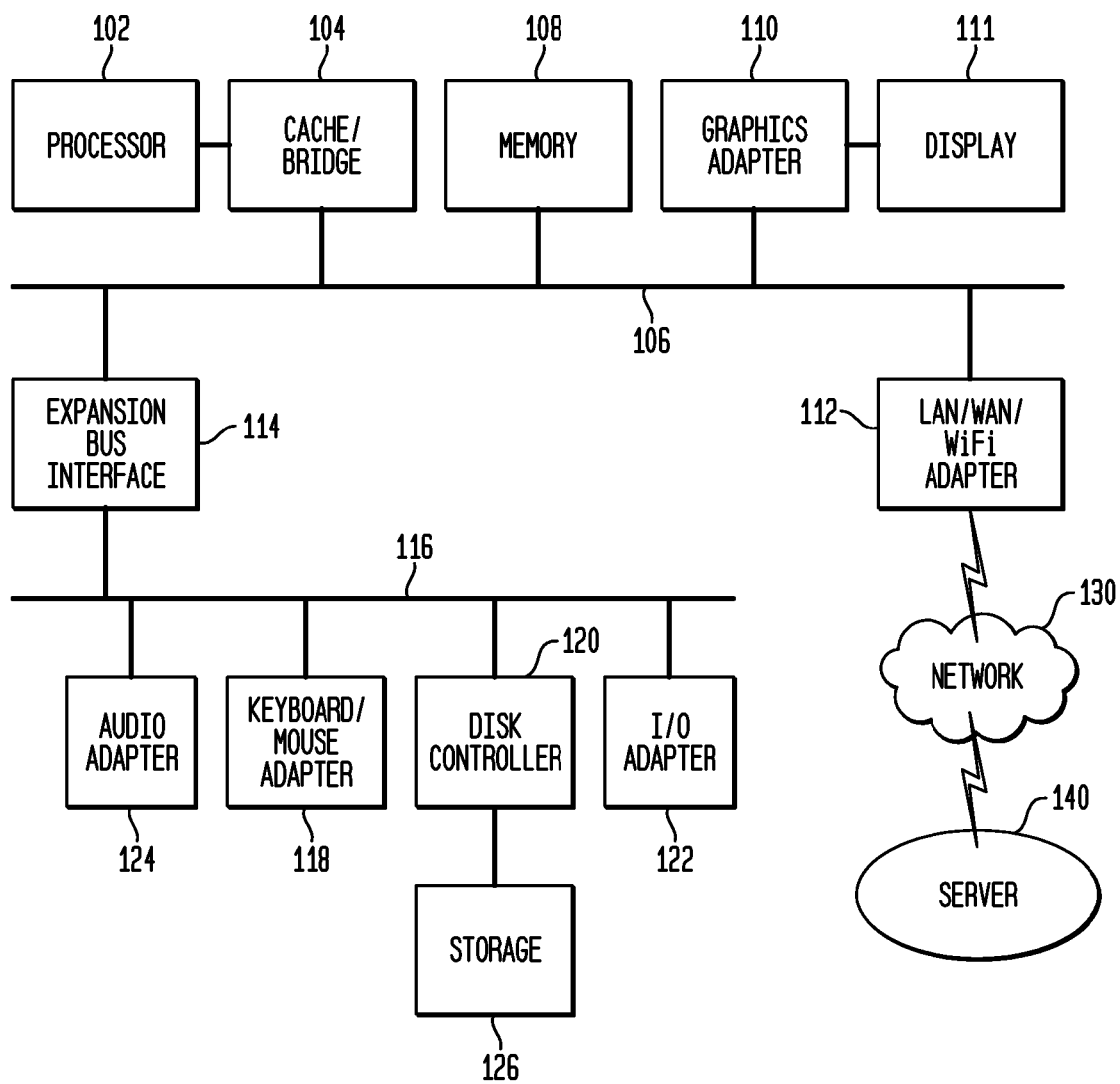
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/ Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/ WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
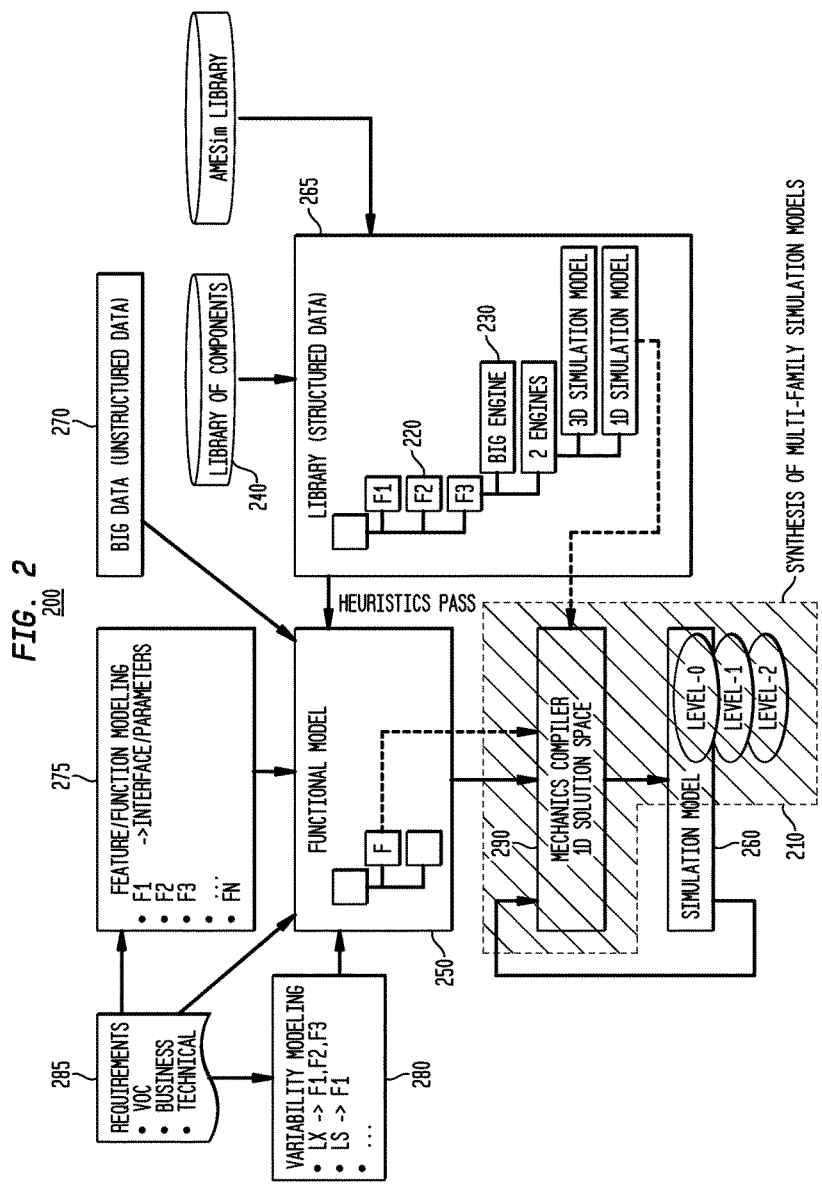
FIG. 2 illustrates an example of a system in which a synthesis of simulations models is performed in accordance with disclosed embodiments.

FIG. 2 illustrates an example of a process 200 in which a synthesis of simulations models 260 is performed in accordance with disclosed embodiments. The design space exploration in 1D is an iterative process that requires multiple levels of fidelity in the simulation models 260. These multi-fidelity simulation models 260 are referred to as "Level-0," "Level-1," . . . , "Level-N" simulation models 260 by automotive and aerospace companies. A new concept of functional operators 405 (illustrated in FIG. 4) are used as annotations in functional models 250, or as language to compose engineering rules that specify how primitive components can be assembled in physical structures during high-fidelity simulation model synthesis 210.

The process 200 includes a library of components 240, a functional model 250, a simulation model 260, a structured data library 265, an unstructured big data 270, feature/ function modeling 275, variability modeling 280, and requirements 285. The requirements 285 include business and technical requirements and are used in the feature/ function modeling 275, the functional model 250, and the variability modeling 280. The feature/function modeling 275 perform a series of analysis to determine functions 220. The series of analysis include an interface analysis and a parameter analysis. The functions 220 determined by the analysis are used in the functional model 250. The variability modeling 280 also determines functions 220 used in the functional model 250. Data stored in the unstructured big data 270 is used for the functional model 250. The library of components 240 stores a plurality of simulation components 230 used by the structured data library 265. The structured data library stores functions 220, simulation components 230, and simulations models 260 for use by the functional model 250 and the functional modeling compiler 290. The process 200 parses the functional model 250 which is read by the functional modeling compiler 290 in the simulation model synthesis 210.

Figure 3:
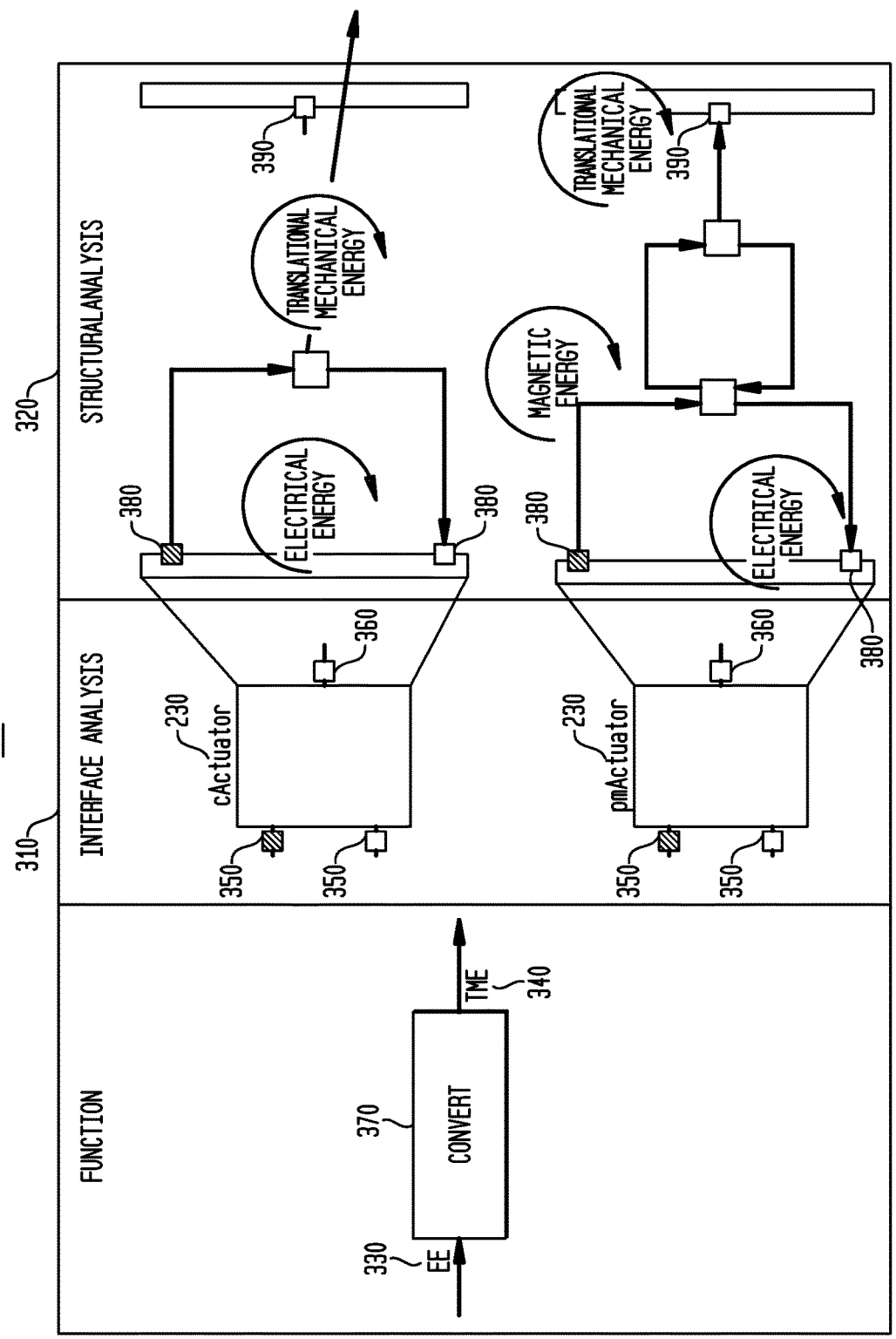
FIG. 3 illustrates a search of a library of components that perform the selected function in accordance with disclosed embodiments.

FIG. 3 illustrates a search 300 of a library of components 240 (illustrated in FIG. 2) that perform the selected function 220 in accordance with disclosed embodiments. The search 300 is performed on a library of components 240 to find simulation components 230 that include the function 220 selected by the user. For example, a user requires a simulation component 230 that includes a "converts electrical energy to translational mechanical energy" function 370, which is the selected function 220. The system performs an interface analysis 310 on the simulation components 230 in the library of components 240 to determine the functions 220 of each simulation component 230. The system then searches the library of components 240 to discover the simulation components 230 which include the "converts electrical energy to translational mechanical energy" function 370. In this example, the system discovers "cActuator" and "pmActuator" which both have identical input ports 350 and output ports 360 with three ports, two electrical ports 380 and one translational mechanical energy port 390. Although the interfaces are the same, the internal structures of the two simulation components 230 are different and provided to the user. With the details of the domains or domain interactions of internal structures, the generation of functional models 250 is improved allowing the user to iteratively generate higher fidelity simulation models 260 (illustrated in FIG. 2).

Components 230 include input interfaces 330 and output interfaces 340 which are determined by the interface analysis 310 and the structural analysis 320. In some embodiments, the input interfaces 330 and the output interfaces 340 are defined to determine the simulation components 230 required for a certain apparatus or process. The simulation components 230 include input ports 350 and output ports 360. The system matches the input ports 350 to the input interfaces 330 and the output ports 360 to the output interfaces 340 when correlating functions 220 to the simulation components 230.

Figure 4:
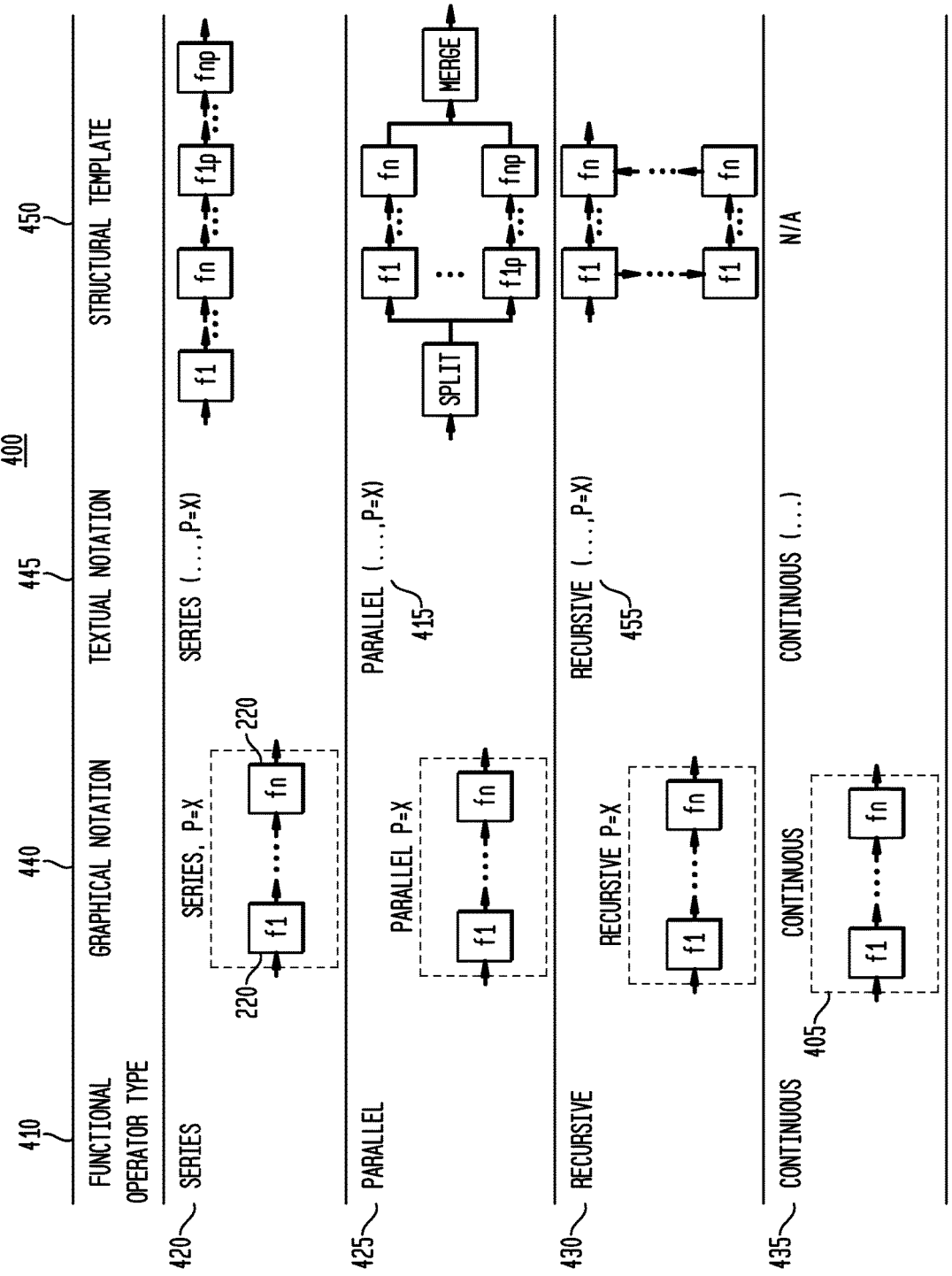
FIG. 4 illustrates examples of functional operators and the respective graphical notation, textual notation, and expansion structure of the functions operators in accordance with disclosed embodiments.

FIG. 4 illustrates a functional operator display 400 of functional operator types 410 and the respective graphical notation 440, textual notation 445, and structural template 450 for the functions operator types 410 in accordance with disclosed embodiments.

A challenge in the generation of high-fidelity simulation models 260 is related to the instantiation of primitive components into specific topologies or physical structures. A functional operator 405 is used as annotation in a functional model 250 or as a language to compose engineering rules to assemble primitive components in physical structures during high-fidelity simulation model synthesis 210 (illustrated in FIG. 2). Functional operators 405 allow software and systems engineers to reason about the system at the functional level and provide an explicit way for influencing the simulation model synthesis 210. A functional operator 405 includes a functional operator type 410 and a functional operator parameter 415. Different functional operator types 410 include, but are not limited to, a series functional operator 420, a parallel functional operator 425, a recursive functional operator 430, and a continuous functional operator 435. The functional operator parameter 415 provides an integer, list, floating point, Boolean value, or any other type of parameter for the amount of times to use a structural template 450 for the functional operator 405 when mapping the function 220 to a simulation component 230. The continuous functional operator 435 does not have a functional operator parameter 415.

The functional operator display 400 contains a list of functional operator types 410 and displays the functional operator types 410 along with the respective graphical notation 440, textual notation 445, and the structural template 450. The graphical notation 440 illustrates an application of the functional operation types 410 to the functional model 250. The textual notation 445 illustrates an application of the function operation types 410 to the functional model code 455. The structural template 450 displayed is a visual representation of the functional operator 405 applied to a plurality of simulation components 230. The structural template 450 defines the modification to the functional model 250 for the functional operator 405 based on the graphical notation 440 or the textual notation 445. The structural template 450 is stored in a functional operator structural template library 1365 (illustrated in FIG. 13). The continuous functional operator 435 does not have a displayed structural template 450, because the application of the continuous functional operator 435 is dependent on the refinement of the function 220.

Figure 5:
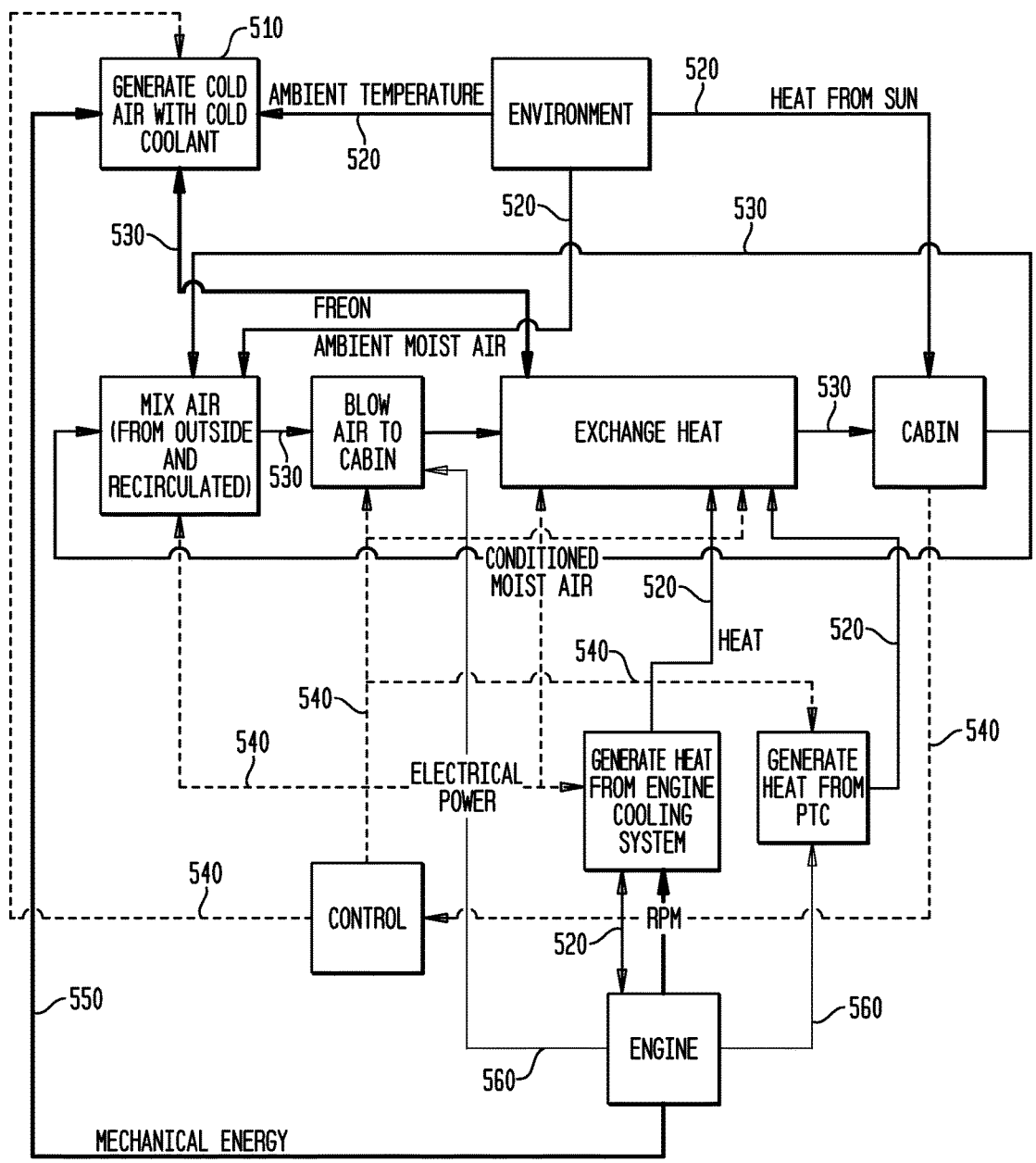
FIG. 5 illustrates a realistic functional model of an automotive heating, ventilation, and air conditioning (HVAC) system in accordance with disclosed embodiments.

FIG. 5 illustrates a realistic functional model 250 of an automotive heating, ventilation, and air conditioning (HVAC) system 500 in accordance with disclosed embodiments.

The functional model 250 illustrated in FIG. 5 illustrates a realistic top-level functional model 250 created for a HVAC system 500 for a car. The HVAC system 500 and the modeled domains are identifiable with marked flows including thermal flow 520, material flow 530, control flow 540, mechanical flow 550, and electrical flow 560. The thermal flow 520 illustrates movement of thermal energy between simulations components 230. The material flow 530 illustrates the movement of materials between simulation components 230. The control flow 540 illustrates control signals between simulations components 230. The mechanical flow 550 illustrates mechanical movement of energy between simulations components 230. The electrical flow 560 illustrates movement of electrical energy between simulation components 230

FIG. 6 illustrates a functional decomposition 600 and allocation of functions 220 to simulation components 230 in accordance in accordance with disclosed embodiments. The functional decomposition 600 illustrated in FIG. 6 is performed on the "generate cold coolant" functional component 510 from FIG. 5. The functional model 250 includes a functional architecture 630 for each of the levels in the functional model 250.

In this embodiment, the functional model 250 illustrates the "generate cold coolant" functional component 510 consists of six functions 220, including: "convert gas to liquid," "increase pressure," "export thermal energy," "regulate liquid," "convert liquid to gas/transmit liquid/thermal energy to gas/thermal energy," and "regulate gas." The allocation of the functions 220 of the "generate cold coolant" functional component 510 to simulation components 230 using a straightforward allocation method leads to a simulation model 260. The functional flows 610 in the functional model 250 correspond to simulation flows 620 in the simulation model 260 and contain a 1:1 correspondence between functions 220 and simulation components 230 except for function 4 and function 6. Function 4 and function 6 are mapped into a single thermal expansion valve (TXV) because the simulation component 230 can perform both the "regulate gas" function 220 and "regulate liquid" function 220. The simulation model 260 fulfills the functionality specified in the functional model 250.

Figure 7A:
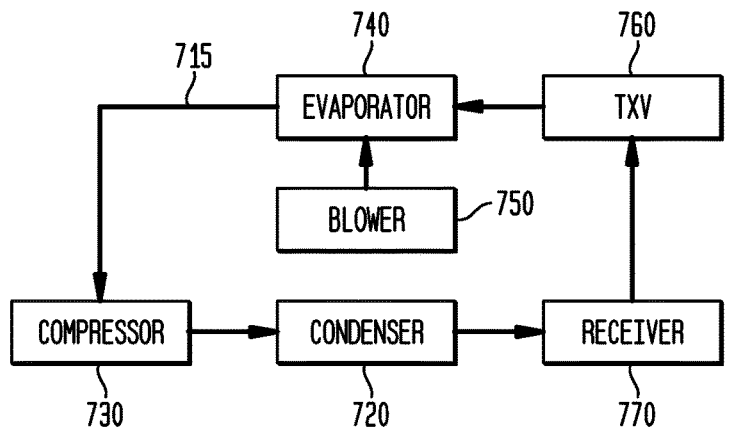
FIGS. 7A-7C illustrate alternative functional architectures in accordance with disclosed embodiments.
Figure 7B:
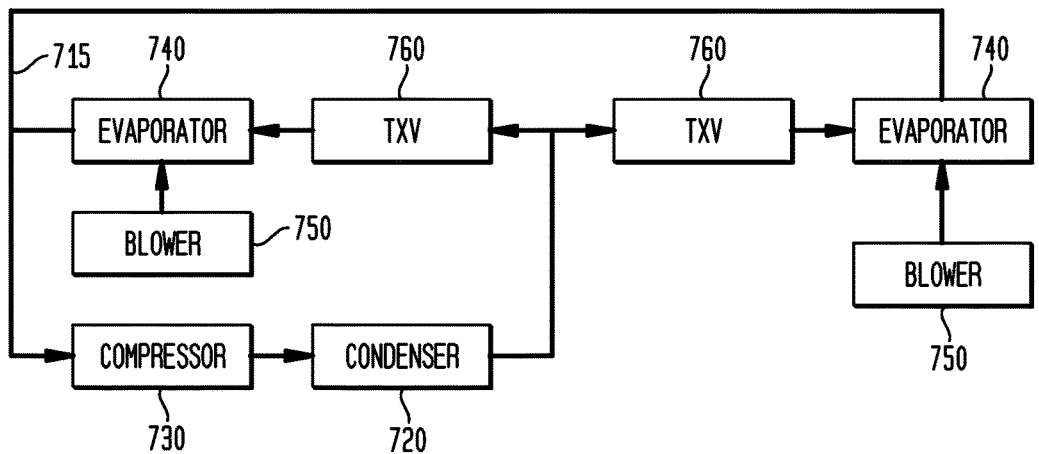
Figure 7C:
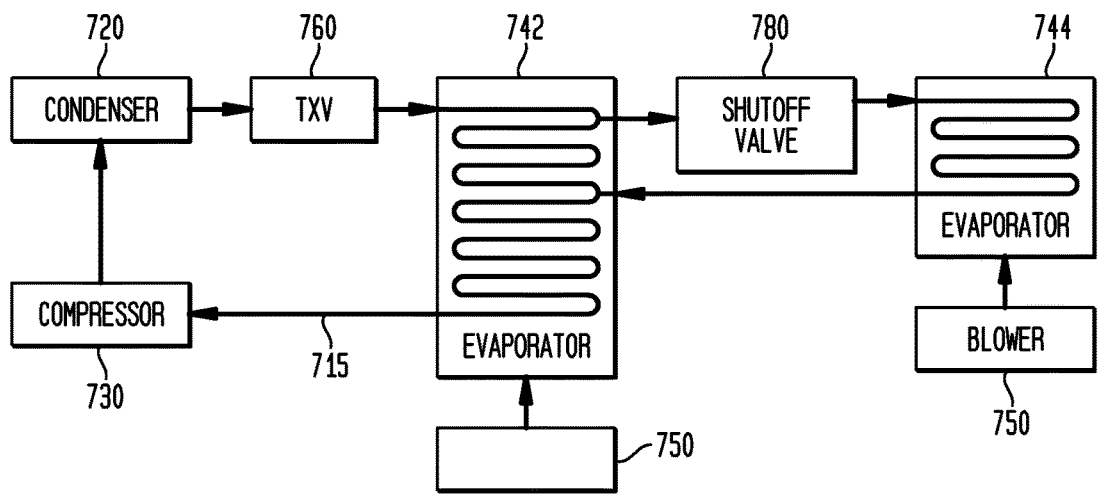

FIGS. 7A-7C illustrate alternative functional architectures 630 in accordance with disclosed embodiments. FIG. 7A illustrates an HVAC functional architecture 700 for a HVAC system in accordance with disclosed embodiments. FIG. 7B illustrates a dual climate control HVAC system 705 with two TXVs 760, two evaporators 740, and two blowers 750 in accordance with disclosed embodiments. FIG. 7C illustrates a dual climate control HVAC system 710 with two evaporator 740 and two blowers 750 in accordance with disclosed embodiments.

The three functional architectures 630 illustrated in FIGS. 7A-7C share the same functional architecture 630 of the functional model 250 in FIG. 6. Although the number and arrangement of the functional components 510 are different, the alternative functional architectures 630 all have similar functional components 510, including condensers 720, compressors 730, evaporators 740, blowers 750, and TXVs 760. FIG. 7A includes an additional receiver 770.

FIG. 7B illustrates a dual climate control HVAC system 705 with a compressor 730, a condenser 720, two TXVs 760, two evaporators 740, and two blowers 750. The refrigerant flow 715 from the condenser 720 is split and routed into the two independent TXVs 760, and the refrigerant flow 715 is merged and routed back to the compressor 730 from the two evaporators 740.

FIG. 7C illustrates a dual climate control HVAC system 710 with a compressor 730, a condenser 720, a TXV 760, two evaporators 740, two blowers 750, and a shutoff valve 780. A portion of the refrigerant flow 715 from the main evaporator 742 is routed to the secondary evaporator 744 and controlled through the shut-off valve 780. The refrigerant flow 715 from the secondary evaporator 744 is routed back to the primary evaporator 742 through a bypass inlet. A single refrigerant flow 715 is routed to the compressor 730. FIGS. 7B and 7C illustrate the challenge of generating alternative functional architectures 630 from a functional model 250 as two out of many possible alternatives.

FIG. 8 illustrates a parallel functional operator 425 used to synthesize a dual TXV-evaporator implementation 800 in accordance with disclosed embodiments. In this embodiment, the functional operator type 410 is a parallel functional operator 425 and includes a functional operator parameter 415 of two. The parallel functional operator 425 is used on the "regulate gas," "regulate liquid," and the "convert liquid to gas/transmit liquid/thermal energy to gas/thermal energy" functions 220 and their respective functional flows 610. The system instantiates two TXVs 760, two evaporators 740, and two blowers 750 based on the functional operator parameter 415. The resulting functional model 810 corresponds to the functional architecture 630 of the dual climate control HVAC system 705 from FIG. 7B.

FIG. 9 illustrates a recursive functional operator 430 used to synthesize a dual TXV-evaporator implementation 900 in accordance with disclosed embodiments. In this embodiment, the functional operator type 410 is a recursive functional operator 430 and includes a functional operator parameter 415 of two. The recursive functional operator 430 is used on the "convert liquid to gas/transmit," "regulate liquid," and the "convert liquid to gas/transmit liquid/thermal energy to gas/thermal energy" functions 220 and their respective functional flows 610. The system instantiates two evaporators 740 and two blowers 750 based on the functional operator parameter 415. The resulting functional model 910 corresponds to the functional architecture 630 of the dual climate control HVAC system 710 from FIG. 7C.

Figure 10:
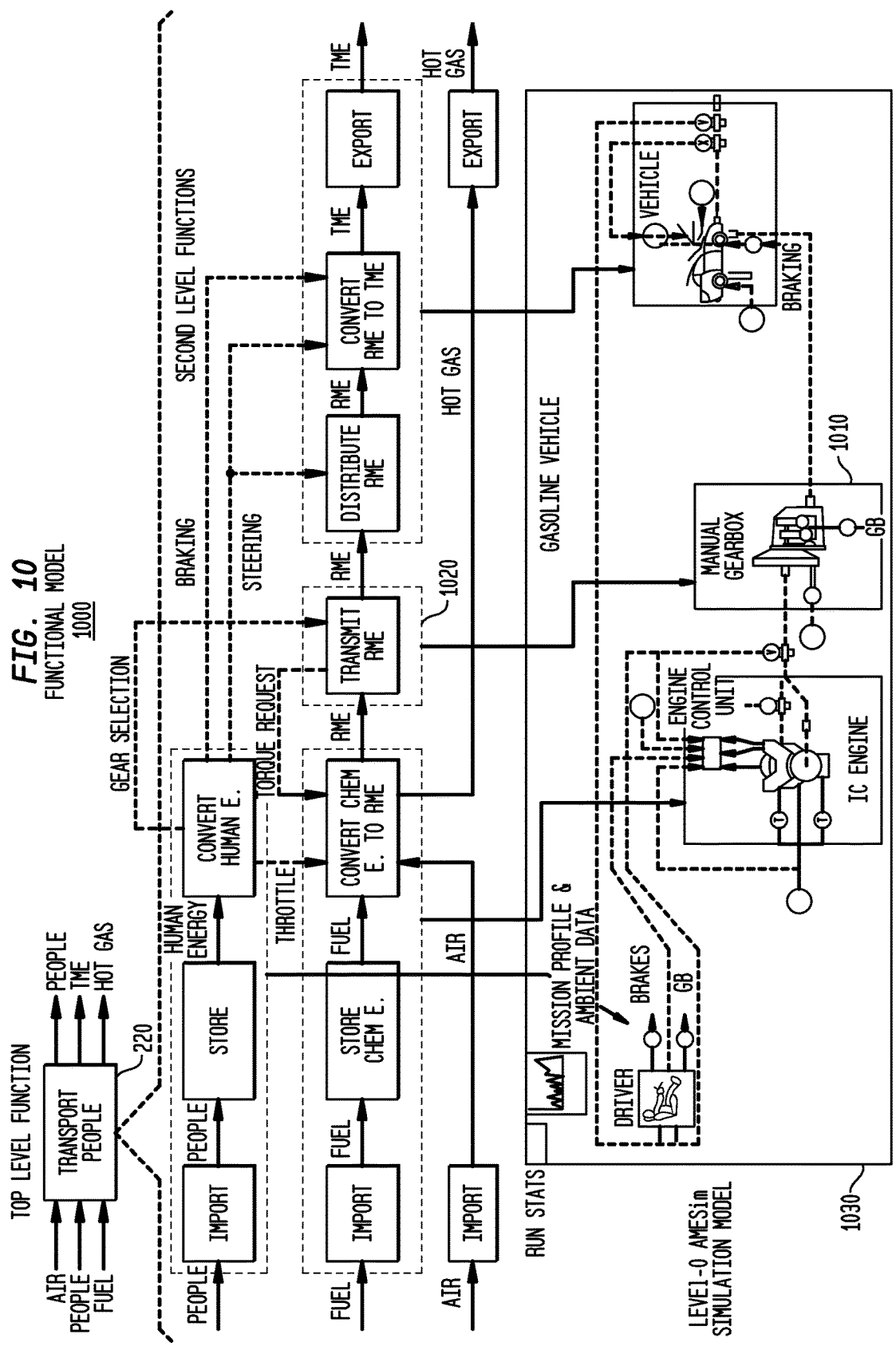
FIG. 10 illustrates a synthesis of a level-0 simulation model in accordance with disclosed embodiments.

FIG. 10 illustrates a synthesis 1000 of a level-0 simulation model 1030 in accordance with disclosed embodiments. In this embodiment, a level-0 simulation model 1030 of a manual transmission and gearbox is synthesized. The simulation model 230 generated for the level-0 simulation model 1030 simply allocates a "manual gearbox" simulation component 1010 from the library of components 240 to the "transmit rotational mechanical energy" function 1020 in the functional model 250. The simulation model 260 also illustrates the other simulation components 230 mapped from the other functions 220 of the functional model 250.

Figure 11:
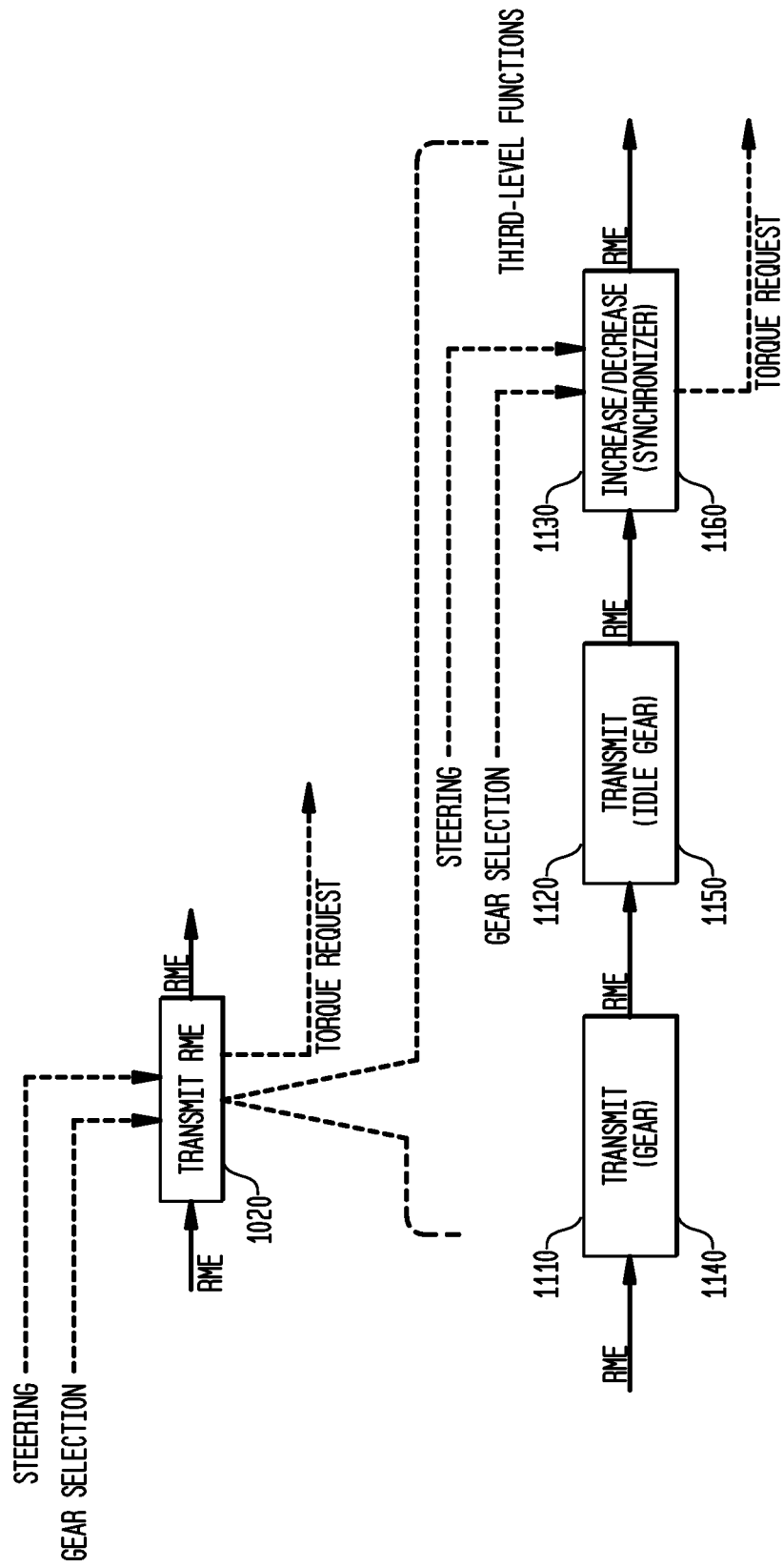
FIG. 11 illustrates a functional decomposition of the "Transmit RME" function in accordance with disclosed embodiments.

FIG. 11 illustrates a functional decomposition 1100 of the "transmit RME" function 1020 in accordance with disclosed embodiments. The "manual gearbox" simulation component 1010 from the level-0 simulation model 1030 does not provide sufficient details about the forces acting on the gears of the transmission that is needed for a level-1 simulation model 1210 (illustrated in FIG. 12). To synthesize a level 1 simulation model 1210, the system creates a functional decomposition 1100 for the "transmit RME" function 1020. The function decomposition 1100 for the "manual gearbox" simulation component 1010 produces two "transmit RME to RME" functions 1110, 1120 and an "increase/decrease RME" function 1130. The "transmit RME to RME" function 1110 is allocated as a "gear" simulation component 1140, the "transmit RME to RME" function 1120 is allocated as an "idle gear" simulation component 1150 and the "increase/decrease RME" function 1130 is allocated as a "synchronizer" simulation component 1160.

Figure 12:
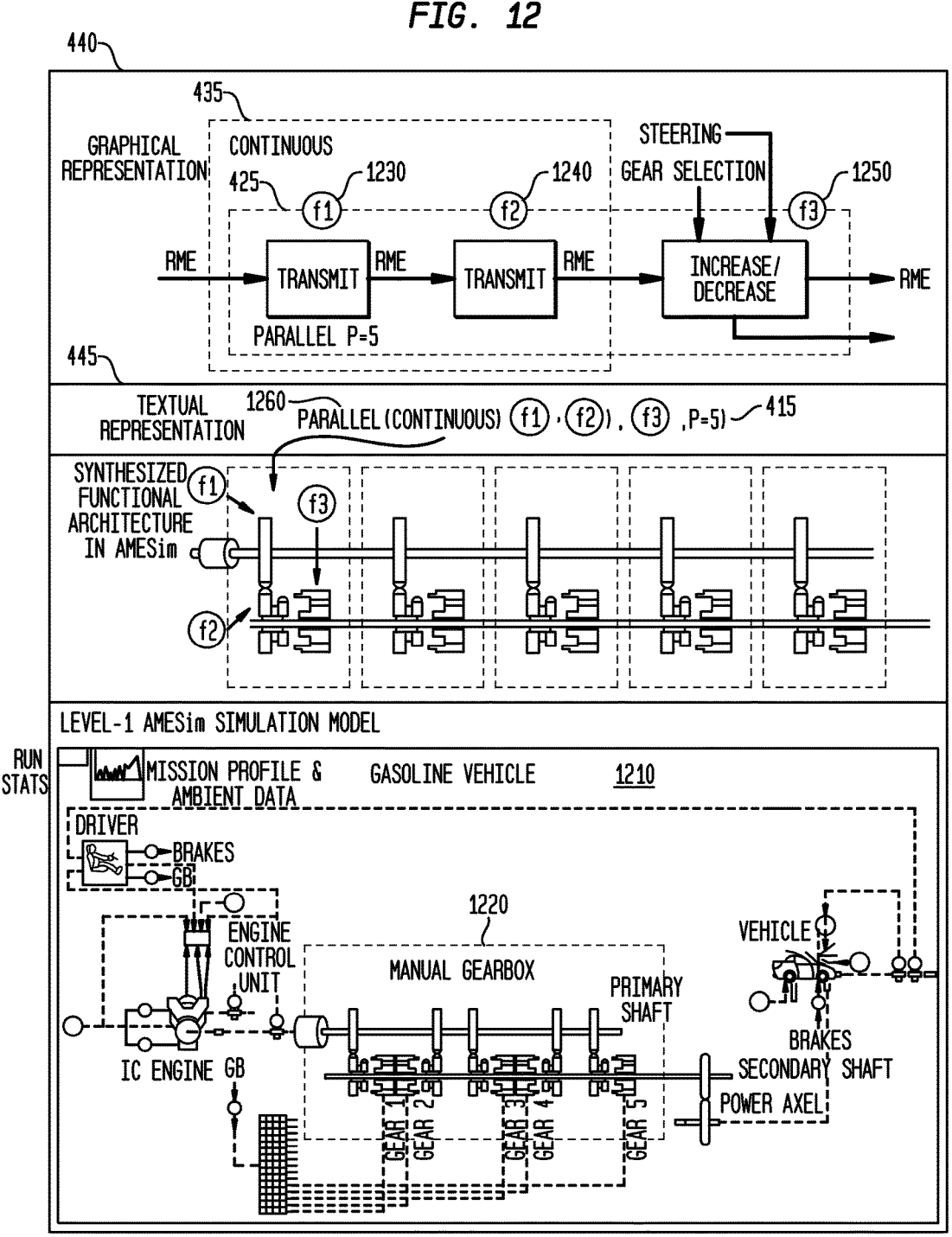
FIG. 12 illustrates use of a continuous functional operator and a parallel functional operator to synthesize a level-1 simulation model in accordance with disclosed embodiments.

FIG. 12 illustrates use of a continuous functional operator 435 and a parallel functional operator 425 to synthesize a level-1 simulation model 1210 in accordance with disclosed embodiments. In this embodiment, functional operators 405 are used to synthesize a five-gear manual transmission simulation component 1220. The continuous functional operator 435 is specified for the "f1" function 1230 and the "f2" function 1240, and the parallel functional operator 425 is specified for the "f1" function 1230, the "f2" function 1240, and the "f3" function 1250. The parallel functional operator 425 includes a functional operator parameter 415 of five. For a parallel functional operator 425, the system generates five instances of a set of components including, where the set of components includes a "gear" simulation component 1140 (illustrated in FIG. 11) for the "f1" function 1230, an "idle gear" simulation component 1150 (illustrated in FIG. 11) for the "f2" function 1240, and a "synchronizer" simulation component 1160 (illustrated in FIG. 11) for the "f3" function 1250. For a continuous functional operator 435, the system configures the five instances where the rotational mechanical energy is always being propagated to all the sets of gears. The combination of the two functional operators 405 generates "five-gear manual transmission" simulation component 1220 for use in a level-1 simulation model 1210.

Multiple functional operators 405 can be used to refine the functional model 250. Because multiple functional operators 405 can be used, the refining of the functional model 250 can include embedded functional operators. The system synthesizes the embedded functional operators 1260 before synthesizing functional operators 405 which contain the embedded functional operators 1260. The system determines the order of non-embedded functional operators based on order of creation, order of flow, or any other order of operations.

Figure 13:
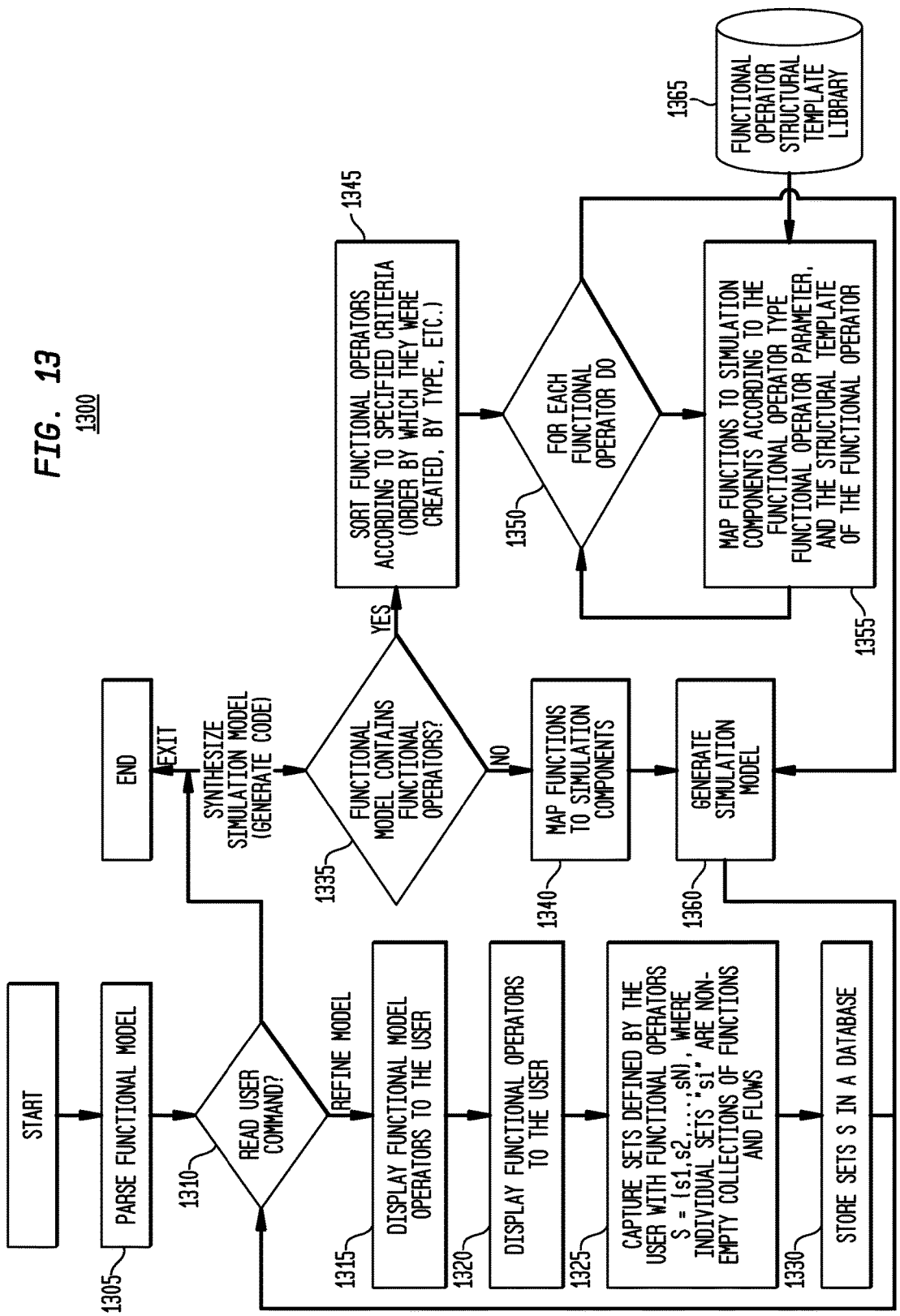
FIG. 13 illustrates a flowchart of a process to synthesize simulation models using functional operators in accordance with disclosed embodiments.

FIG. 13 illustrates a flowchart 1300 of a process to synthesize simulation models 260 using functional operators 405 in accordance with disclosed embodiments.

In step 1305, the system parses the functional model 250. The functional model 250 includes a number of different levels where the first level or top-level function model 250 is the highest level and includes the most basic functions 220 of the functional model 250. Each level down splits the highest level functions 220 into more detailed functions 220. The functional model 250 also includes the input interfaces 330 and output interfaces 340 of the functions 220.

In step 1310, the system receives a command from the user. Typical commands include, but are not limited to, "refining the model," "synthesizing the simulation model," and "exiting." When the system receives a user command to "refine the model," the system proceeds with step 1315. When the system receives a user command to "synthesize the model," the system proceeds with step 1335. When the system receives a user command to "exit," the system ends the process. Some commands include further instructions, such as the user designating what level fidelity model is selected to be refined.

In step 1315, the system displays the functional model 250 to the user. The top-level functional model 250 is displayed to the user. In some embodiments, the system displays multiple levels of the functional model 250. In other embodiments, the user designates the level of the functional model 250 displayed in a command received by the system.

In step 1320, the system displays the functional operators 405 to the user. The functional operators 405 displayed to the user include a selectable list of the functional operator types 410. The list of functional operator types 410 includes a series functional operator 420, a parallel functional operator 425, a recursive functional operator 430, and a continuous operator 435. The functional operators 405 are displayed for the user to modify the functional model 250. The functional operators 405 are displayed in the same window as the functional model 250. In other embodiments, the functional operators 405 are displayed in a functional operators display 400. The functional operators display 400 can be a separate window or a pop-up window. In some embodiments, the windows are displayed individually and the user switches between the two depending on the user making a change to the functional model 250 or choosing a functional operator 405.

The functional operator 405 also includes a functional operator parameter 415, where the functional operator parameter 415 defines the amount of structural templates 450 for the functional operator types 410 that are applied to the respective part of the functional model 250 where the functional operator 405 is applied. The functional operator parameter 415 can be input with the functional operator types 410 or after the functional operator type 410 has been defined to the functional model 250.

In step 1325, the system captures the functional operators 405 defined by the user in functional model 250. The individual sets, are non-empty collections of functions 220 and functional flows 610 for collection of sets S={s$_1$, s$_2$, ... s$_N$}. Because multiple functional operators 405 can be used to refine the functional model 250, the refining of the functional model 250 can include embedded functional operators 1260. The system synthesizes the embedded functional operators 1260 before synthesizing functional operators 405 which contain the embedded functional operators 1260.

In step 1330, the system stores the collections of sets S in a database. Once the system completes the storage of the collections of set S, the system proceeds back to step 1310.

In step 1335, the system determines whether the functional model 250 contains functional operators 405. When the system determines that the functional model 250 contains functional operators 405, the system proceeds to step 1345. When the system determines that the functional model 250 does not contain functional operators 405, the system proceeds to step 1340.

In step 1340, the system maps the functions 220 to simulation components 230. The system generates the simulation component 230 from the library of components 240 based on the function 220 in the functional model 250. When more than one simulation component 230 is found in the library of components 240 for that specific function 220, the system compares the functions 220 at the next level to decide which simulation component 230 to generate. The simulation components 230 in the library of components 240 are analyzed and correlated to functions 220 and the correlations are stored in a components-to-function database. The system uses the database when determining which simulation component 230 to map to the function 220.

In step 1345, the system sorts the functional operators 405 according to specified criteria (order by which they were created, by type, etc). When functions 220 are embedded functional operators 1260, the embedded functional operators 1260 are ordered before the functions which contain the embedded functional operators 1260.

In step 1350, the system determines whether the functional model 250 contains any functional operators 405 which have not been applied to the function model 250. For each functional operator 405, the system proceeds to step 1355. Once all the functional operators 405 have been applied to the functional model 250, the system proceeds to step 1360.

In step 1355, the system maps the functions 220 to the simulation components 230 according to the functional operator type 410, the functional operator parameter 415, and the structural template 450 of the functional operator 405. The system receives the structural template 450 for the functional operator type 410 from the functional operator structural template library 1365. The system maps a plurality of functions 220 according to the functional operator 405 to update the simulated component 230. When the functional operator type 410 of the functional operator 405 received is a series functional operator 420, simulating an amount of the functions 220 equal to the functional operator parameter 415 mapped using the structural template 450 for the series functional operator 420. When the functional operator type 410 of the functional operator 405 received is a parallel functional operator 425, simulating an amount of the functions 220 equal to the functional operator parameter 415 mapped using the structural template 450 for the parallel functional operator 425. When the functional operator type 410 of the functional operator 405 received is a recursive functional operator 430, simulating an amount of the functions 220 equal to the functional operator parameter 415 mapped using the structural template 450 for the recursive functional operator 430. When the functional operator type 410 of the functional operator 405 received is a continuous functional operator 435, simulating the function 220 mapped using the structural template 450 for the continuous functional operator 435.

In step 1360, the system generates the simulations model 260 with the updated simulation components 230. The simulation model 260 generated is based on the level of fidelity selected by the user.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for synthesis of simulation models using functional operators, the method performed by a data processing system and comprising:
    parsing a functional model;
    receiving a functional operator for a function within a simulation component of the functional model;
    receiving a structural template of the functional operator from a functional operator structural template library;
    mapping a plurality of functions according to the structural template of the functional operator to update the simulation component; and
    generating a simulation model with the updated simulation component,
    wherein the functional operator comprises a functional operator type and a functional operator parameter,
    wherein mapping at least one of the plurality of functions comprises either:
        simulating an amount of the functions equal to the functional operator parameter mapped using the structural template for a series functional operator, based on the functional operator type of the functional operator received being a series functional operator; or
        simulating an amount of the functions equal to the functional operator parameter mapped using the structural template for a parallel functional operator, based on the functional operator type of the functional operator received being a parallel functional operator.

2. The method of claim 1 further comprising:
    creating a functional decomposition on the simulation component for use in a higher fidelity simulation model.

3. The method of claim 1, wherein mapping the plurality of functions comprises:
    simulating an amount of the functions equal to the functional operator parameter mapped using the structural template for the series functional operator, based on the functional operator type of the functional operator received being the series functional operator.

4. The method of claim 1, wherein mapping the plurality of functions comprises:
    simulating an amount of the functions equal to the functional operator parameter mapped using the structural template for the parallel functional operator, based on the functional operator type of the functional operator received being the parallel functional operator.

5. The method of claim 1, wherein mapping the plurality of functions comprises:
    simulating an amount of the functions equal to the functional operator parameter mapped using the structural template for a recursive functional operator based on the functional operator type of the functional operator received being a recursive functional operator.

6. The method of claim 1, wherein mapping the plurality of functions comprises:
    simulating the function mapped using the structural template for a continuous functional operator, based on the functional operator type of the functional operator received being a continuous functional operator.

7. A data processing system comprising:
    a processor; and
    an accessible memory, the data processing system particularly configured to:
        parse a functional model;
        receive a functional operator for a function within a simulation component of the functional model;
        receive a structural template of the functional operator from a functional operator structural template library;
        map a plurality of functions according to the structural template of the functional operator to update the simulation component; and
        generate a simulation model with the updated simulation component,
    wherein the functional operator comprises a functional operator type and a functional operator parameter,
    wherein to map at least one of the plurality of functions comprises either:
        simulating an amount of the functions equal to the functional operator parameter mapped using the structural template for a series functional operator, based on the functional operator type of the functional operator received being a series functional operator; or
        simulating an amount of the functions equal to the functional operator parameter mapped using the structural template for a parallel functional operator, based on the functional operator type of the functional operator received being a parallel functional operator.

8. The data processing system of claim 7 further comprising:
    create a functional decomposition on the simulation component for use in a higher fidelity simulation model.

9. The data processing system of claim 7, wherein to map the plurality of functions comprises:
    simulating an amount of the functions equal to the functional operator parameter mapped using the structural template for the series functional operator, based on the functional operator type of the functional operator received being the series functional operator.

10. The data processing system of claim 7, wherein to map the plurality of functions comprises:
simulating an amount of the functions equal to the functional operator parameter mapped using the structural template for the parallel functional operator, based on the functional operator type of the functional operator received being the parallel functional operator.

11. The data processing system of claim 7, wherein to map the plurality of functions comprises:
simulating an amount of the functions equal to the functional operator parameter mapped using the structural template for the recursive functional operator, based on the functional operator type of the functional operator received being a recursive functional operator.

12. The data processing system of claim 7, wherein to map the plurality of functions comprises:
simulating the function mapped using the structural template for the continuous functional operator, based on the functional operator type of the functional operator received being a continuous functional operator.

13. A non-transitory computer-readable medium encoded with executable instructions that, when executed by at least one processor, cause the at least one processor to carry out a method comprising:
parsing a functional model;
receiving a functional operator for a function within a simulation component of the functional model;
receiving a structural template of the functional operator from a functional operator structural template library;
mapping a plurality of functions according to the structural template of the functional operator to update the simulation component; and
generating a simulation model with the updated simulation component,
wherein the functional operator comprises a functional operator type and a functional operator parameter,
wherein mapping at least one of the plurality of functions comprises either:

simulating an amount of the functions equal to the functional operator parameter mapped using the structural template for a series functional operator, based on the functional operator type of the functional operator received being a series functional operator; or
simulating an amount of the functions equal to the functional operator parameter mapped using the structural template for a parallel functional operator, based on the functional operator type of the functional operator received being a parallel functional operator.

14. The computer-readable medium of claim 13 further comprising:
create a functional decomposition on the simulation component for use in a higher fidelity simulation model.

15. The computer-readable medium of claim 13, wherein to map the plurality of functions comprises:
simulating an amount of the functions equal to the functional operator parameter mapped using the structural template for the series functional operator, based on the functional operator type of the functional operator received being the series functional operator.

16. The computer-readable medium of claim 13, wherein to map the plurality of functions comprises:
simulating an amount of the functions equal to the functional operator parameter mapped using the structural template for the parallel functional operator, based on the functional operator type of the functional operator received being the parallel functional operator.

17. The computer-readable medium of claim 13, wherein to map the plurality of functions comprises:
simulating an amount of the functions equal to the functional operator parameter mapped using the structural template for the recursive functional operator, based on the functional operator type of the functional operator received being a recursive functional operator.

* * * * *